United States Patent [19]

Burgdorf

[11] 4,265,490
[45] May 5, 1981

[54] PRESSURE CONTROL VALVE FOR A VEHICLE HYDRAULIC BRAKE SYSTEM

[75] Inventor: Jochen Burgdorf, Offenbach am Main, Fed. Rep. of Germany

[73] Assignee: ITT Industries, Inc., New York, N.Y.

[21] Appl. No.: 61,110

[22] Filed: Jul. 26, 1979

[30] Foreign Application Priority Data

Aug. 21, 1978 [DE] Fed. Rep. of Germany ....... 2836453

[51] Int. Cl.³ .............................................. B60T 8/26
[52] U.S. Cl. .................................................. 303/6 C
[58] Field of Search ..................... 303/6 C, 6 R, 22 R; 188/349

[56] References Cited

U.S. PATENT DOCUMENTS

| | | | |
|---|---|---|---|
| 3,781,063 | 12/1973 | Valpreda | 303/6 C |
| 3,937,523 | 2/1976 | Ayers et al. | 303/6 C |
| 3,976,334 | 8/1976 | Farr | 303/6 C |

Primary Examiner—Duane A. Reger
Attorney, Agent, or Firm—John T. O'Halloran; Alfred C. Hill

[57] ABSTRACT

To prevent overbraking of the vehicle rear wheels, brake pressure control valves are employed comprising essentially a stepped piston and a valve. A control piston is provided which prevents closing of the valve in the event of failure of a brake circuit. The prior known arrangements are expensive to manufacture and require a large number of seals. The invention, therefore, provides a brake pressure control valve in which an annular piston is provided with a bore which is penetrated by the control piston. A first of the annular piston transverse surfaces is subjected to the pressure of the front wheel brake circuit while a second of the annular piston transverse surfaces is subjected to the regulated pressure of the rear wheel brake circuit. The control piston's end adjacent the valve bears against the annular piston in the direction of a control spring.

6 Claims, 2 Drawing Figures

PRESSURE CONTROL VALVE FOR A VEHICLE HYDRAULIC BRAKE SYSTEM

BACKGROUND OF THE INVENTION

This invention relates to a pressure control valve for a vehicle hydraulic brake system including a first brake circuit associated with the front wheels and a second brake circuit associated with the rear wheels, wherein the wheel brake cylinders of the first brake circuit are connected with a first pressure chamber of a master cylinder and the wheel brake cylinders of the second brake circuit are connected with a regulator outlet chamber of the pressure control valve with a regulator inlet chamber of the pressure control valve being connected to a second pressure chamber of the master cylinder, and a valve is arranged in a fluid pressure line between the inlet and outlet chamber, the valve having a closure member on which a control piston acts which is preloaded by a spring and has one surface subjected to the pressure of the first brake circuit.

From German Pat. No. 1,958,398 a brake pressure control valve is known by means of which the pressure increase in the brake circuit associated with the rear wheels is reduced above a predetermined change-over pressure. The brake pressure control valve includes a stepped piston which is slidable against a control spring and opens or closes the valve. The valve closure member is arranged interiorly of the stepped piston and includes a tappet bearing against a pin. The pin is secured to a piston which is subjected to the pressure of the brake circuit associated with the front wheels and slidable against a second spring. In the presence of pressure in the front wheel brake circuit, the piston and thus the pin are displaced against the spring, and the pin releases the valve closure member. At the same time, the rear wheel brake circuit is pressurized, too, and when a predetermined pressure has been attained the stepped piston is displaced and the valve is closed. In the event of failure of the front wheel brake circuit, the pin is not diplaced and therefore does not release the valve closure member, i.e., the pressure in the rear wheel brake circuit increases unreduced.

The known arrangement which has proved efficient because of its safe function includes a great number of individual components which results in high material and assembly costs.

SUMMARY OF THE INVENTION

It is, therefore, an object of the present invention to provide a pressure control valve of the type referred hereinabove which includes a substantially smaller number of individual components and thus reduces the manufacturing costs.

A feature of the present invention is the provision of a pressure control valve for a vehicle hydraulic brake system including a first brake circuit connected between front wheel brake cylinders of a vehicle and one pressure chamber of a tandem master cylinder and a second brake circuit associated with rear wheel brake cylinders of the vehicle comprising: a housing having a longitudinal axis and a first bore coaxial of the axis; a pressure chamber disposed in the first bore adjacent one end thereof coupled to the one chamber; a regulator inlet chamber disposed in the first bore adjacent the other end thereof coupled to the other chamber of the master cylinder; a regulator outlet chamber disposed in the first bore spaced from and communicating with the regulator inlet chamber through a fluid passageway within the first bore coaxial of the axis, the regulator outlet chamber being coupled to the rear wheel brake cylinders; a valve having a closure member disposed in a controlling relationship with the fluid passageway; an annular piston disposed in the first bore slidable therein between limits, the annular piston having one annular surface thereof providing a boundary for the regulator outlet chamber and subject to regulated pressure of the second brake circuit, the other annular surface thereof providing a boundary for the pressure chamber and subjected to pressure of the first brake circuit, and a second bore coaxial of the axis; and a control piston preloaded by a spring extending through and slidable in the second bore having one end thereof in a controlling relationship with the closure member and bearing on the annular piston in the direction of the spring, and the other end thereof bearing against the spring and having an annular surface providing the other boundary for the pressure chamber and being subjected to pressure of the first brake circuit.

It is an essential advantage of the pressure control valve of the present invention that the manufacturing costs are lower than in the arrangement hitherto known. This is due to the small number of individual components and their straightforward design permitting inexpensive manufacture, and the greater ease of assembly. In contrast to the known arrangement, only one control spring is necessary and, in addition, the number of seals is reduced substantially. Also with regard to its operation the pressure control valve of the present invention distinguishes favorably from prior art arrangements because, in the event of failure of the first brake circuit, the pressure in the second brake circuit is increased up to an increased change-over point and limited when the change-over point has been attained.

In a particularly advantageous embodiment of the pressure control valve of the present invention, the bore of the annular piston has, on the side close to the regulator outlet chamber, a larger step in which a radially enlarged end of the control piston is situated, and the larger annular end surface of the annular piston is subjected to the pressure of the first brake circuit while its smaller annular surface is subjected to the pressure of the second brake circuit. This arrangement ensures that the annular piston assumes its end position close to the valve at the commencement of pressure development in the two brake circuits and is made to follow the movement of the control piston against the control spring by the enlarged end of the control piston whereby it is made to leave the noted end position.

This arrangement permits a bipartite design of the control piston, the two pistons parts being separated at a location close to the bore step. This results in an alteration as regards the regulator function because the annular piston is not moved by the control piston but solely by the differential of force at the end surfaces of the annular piston. The step of the bore of the annular piston suitably serves as a stop for the enlarged end of the control piston.

To limit the travel of displacment of the annular piston, it will be an advantage to provide the circumferential surface of the annular piston with an annular chamber into which a screw serving as a stop extends.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
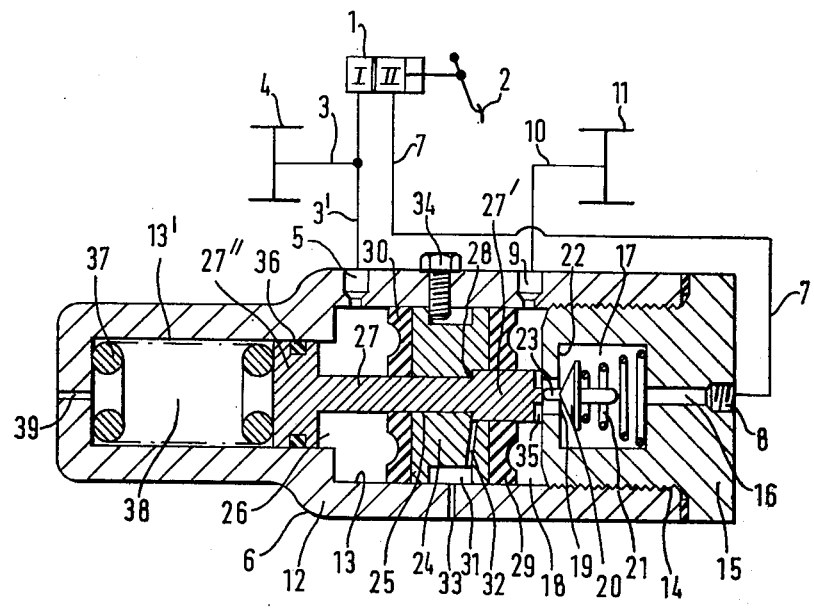
FIG. 1 is a longitudinal cross sectional view of a pressure control valve in accordance with the principles of the present invention in association with a dual-circuit brake system schematically illustrated.

FIG. 1 shows a tandem master cylinder 1 with a first pressure chamber I and a second pressure chamber It, its pistons being actuatable by a brake pedal 2. The first pressure chamber I is connected with wheel brake cylinders of the front wheels 4 through a fluid line 3 and with a first port 5 of a pressure control valve 6 through a fluid line 3'. A fluid line 7 leads from the second pressure chamber II to a second port 8 of pressure control valve 6. A third port 9 connects with wheel brake cylinders of the rear wheels II through a fluid line 10.

Arranged in a housing 12 of pressure control valve 6 is a stepped bore 13, 13' whose larger step is provided with a thread 14 close to the bore's end and has a hollow screw 15 threaded thereinto. The other end of screw 15 accommodates second port 8 which is connected with a regulator inlet chamber 17 through a fluid passageway 16. The inner end of hollow screw 15 forms a boundary for a regulator outlet chamber 18 which connnects with regulator inlet chamber 17 through a fluid orifice 19. Regulator inlet chamber 17 houses a valve closure member 20 which is urged into engagement with a valve seat 22 by a spring 21. Valve closure member 20 includes a tappet 23 extending out of hollow screw 15 on its inner end.

Bore 13 accommodates an annular piston 24 which includes a bore 25 having one step. The smaller end surface of annular piston 24 forms a boundary for regulator outlet chamber 18 and the larger end surface of annular piston 24 forms a boundary for a pressure chamber 26. In bore 25 a control piston 27 is guided which is conformed to the step bore 25. The step of bore 25 serves as a stop 28 to limit the movement of control piston 27 relative to annular piston 24. On both of its ends, annular piston 24 is provided with a respective ring seal 29 and 30 sealing it against the housing 12 and against control piston 27. On its circumferential surface, annular piston 24 includes an annular chamber 31 which is connected through an orifice 32 with bore 25 in the area of the step and, through a bore 33 in housing 12 with atmospheric pressure. Threaded into housing 12 is a screw 34 extending into annular chamber 31 and limiting the axial displacement of annular piston 24.

Control piston 27 comprises three sections of different diameters, the middle section having the smallest diameter and ending at one end 27' in a radial extension projecting into regulator outlet chamber 18. End 27' has a larger diameter than the middle section of control piston 27. In the inactive position, the end surface of control piston 27 directed towards valve closure member 20 is in abutment with the inward end of hollow screw 15 and therefore provided with indentations 35 to allow the passage of pressure-transmitting fluid. The other end 27" of control piston 27 has the largest diameter compared to the two other piston sections. End 27" is housed in the smaller step of bore 13' and sealed against housing 12 by means of a seal 36. With its annular surface adjacent to the middle section of control piston 27, and 27" forms a boundary for pressure chamber 26. Disposed in bore 13' is a control spring 37 bearing with its one end against the front wall of housing 12 and bearing with its other end against end 27". The chamber 38 in which control spring 37 is situated connects with atmospheric pressure through a bore 39.

Figure 2:
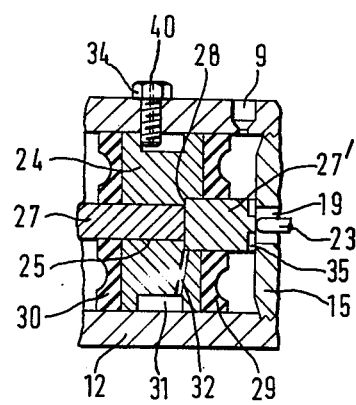
FIG. 2 is a variant of the design of the control piston of FIG. 1.

FIG. 2 shows a detail of pressure control valve 6, the reference numerals corresponding to those of FIG. 1. This version differs from that of FIG. 1 by a bipartite design of control piston 27, wherein control piston 27 and end 27' are separated at a location close to the step of bore 25, and screw 34 includes a longitudinal bore 40, thereby eliminating the need for bore 33 of FIG. 1.

The mode of operation of the pressure control valve of FIG. 1 shall first be described for the case of both brake circuits being intact. As brake pedal 2 is depressed, a pressure is generated in pressure chambers I and II of master cylinder 1, the pressure of the first brake circuit propagating through fluid line 3 to the wheel brake cylinders of front wheels 4 as well as through fluid line 3' and first port 5 of pressure control valve 6 to pressure chamber 26, and the pressure of the second brake circuit propagating through fluid line 7, second port 8 of pressure control valve 6 and through fluid passageway 16 to regulator inlet chamber 17. Since control piston 27, as a result of the force of control spring 37 acting on it, is initially in its end position close to the valve whereby tappet 23 of valve closure member 20 is in abutment with end 27' of control piston 27, the valve is open and fluid is free to flow from regulator inlet chamber 17 into regulator outlet chamber 18. The pressure prevailing in regulator outlet chamber 18 propagates from third port 9 through fluid line 10 to the wheel brake cylinders of rear wheels 11.

Since the pressures in pressure chamber 26 and in regulator outlet chamber 18 are of equal magnitude, annular piston 31 is kept in its end position close to the valve as a result of the different end surface areas.

When the pressure in pressure chamber 26 is at a predetermined level, control piston 27 is displaced against control spring 37. End 27' of control piston 27 being in abutment with stop 28, annular piston 24 is bound to follow the movement of control piston 27. As a result of the displacement of control piston 27, valve closure member 20 is urged into engagement with valve seat 22 by spring 21 and fluid orifice 19 is closed. With the pressure in pressure chambers I and II of master cylinder 1 continuing to increase, a reduced brake pressure will be delivered to the rear wheel brakes. With the valve closed, the force acting on the smaller annular surface of annular piston 24 and on the end surface of control piston end 27' remains constant. With the pressure in pressure chamber 26 increasing, annular piston 24 is moved in the direction towards the valve, causing control piston 27 to follow its movement, and tappet 23 which bears again against end 27' of control piston 27 opens the valve. Fluid is thereby allowed to flow from regulator inlet chamber 17 into regulator outlet chamber 18. Then control piston 27 moves again against control spring 37 causing annular piston 24 to follow its movement.

If the second brake circuit fails because of a defect, the first brake circuit and, thus, the effectiveness of the front wheel brakes are not affected.

Conversely, if the first brake circuit fails, depression of brake pedal 2 causes generation of pressure in second pressure chamber II only, which pressure, as described in the foregoing, propagates up to the wheel brake cylinders of the rear wheels. Annular piston 24 is only subjected to the pressure prevailing in regulator outlet chamber 18 and, therefore is displaced in the direction of pressure chamber 26, the axial displacement being limited by screw 34 serving as a stop. The pressure prevailing in regulator outlet chamber 18 also acts on the end surface of the control piston's end 27', this surface is, however, substantially smaller then the end surface of control piston's end 27''' adjacent pressure chamber 26. Therefore, displacement of control piston 27 against control spring 37 can only occur at an increased pressure level. Thereby, the valve is closed and not opened again because of the lack of pressure in pressure chamber 26, i.e., the brake pressure in the second brake circuit is thus limited.

The mode of operation of the pressure control valve including a bipartite control piston 27 as shown in FIG. 2 corresponds essentially to that described in the foregoing with reference to FIG. 1. To avoid repetitions, only the differences shall be dealt with in the following.

With both brake circuits intact, control piston 27 is displaced against control spring 37 when the pressure has reached a predetermined magnitude. This movement is accompanied by movements of annular piston 24 and end 27' not as a result of a mechanical coupling as in FIG. 1, but as a result of the different effective surfaces of annular piston 24 and end 27' of control piston 27. The valve closes thereby and the pressure is reduced as desired. With the pressure in the pressure chambers I and II continuing to increase, the side of annular piston 24 adjacent pressure chamber 26 is subjected to a higher pressure than the side close to regulator outlet chamber 18. Thereby, annular piston 24 is moved towards the valve with end 27' of control piston 27. In contrast to FIG. 1, however, control piston 27 is not made to follow that movement. The displacement of annular piston 24 results in tappet 23 bearing again against end 27' and opening of the valve. Pressure-transmitting fluid is thereby allowed to flow from regulator inlet chamber 17 into regulator outlet chamber 18. Annular piston 24 then moves again in the direction towards pressure chamber 26.

In the event of a failure of one of the two brake circuits, the mode of operation of the arrangement of FIG. 2 is the same as that of FIG. 1.

In the arrangement of FIG. 2, the displacement of control piston 27 against control spring 37 is no longer limited by stop 28. It will be useful, therefore, to provide in chamber 38 a stop means limiting the axial displacement of control piston 27 in order to prevent control piston 27 from slipping out of bore 25.

While I have described above the principles of my invention in connection with specific apparatus it is to be clearly understood that this description is made only by way of example and not as a limitation to the scope of my invention as set forth in the objects thereof and in the accompanying claims.

I claim:

1. A pressure control valve for a vehicle hydraulic brake system including a first brake circuit connected between front wheel brake cylinders of a vehicle and one pressure chamber of a tandem master cylinder and a second brake circuit associated with rear wheel brake cylinders of said vehicle comprising:

a housing having a longitudinal axis and a first bore coaxial of said axis;

a pressure chamber disposed in said first bore adjacent one end thereof coupled to said one chamber;

a regulator inlet chamber disposed in said first bore adjacent the other end thereof coupled to the other chamber of said master cylinder;

a regulator outlet chamber disposed in said first bore spaced from and communicating with said regulator inlet chamber through a fluid passageway within said first bore coaxial of said axis, said regulator outlet chamber being coupled to said rear wheel brake cylinders;

a valve having a closure member disposed in a controlling relationship with said fluid passageway;

an annular piston disposed in said first bore slidable therein between limits, said annular piston having one annular surface thereof providing a boundary for said regulator oulet chamber and subject to regulated pressure of said second brake circuit, the other annular surface thereof providing a boundary for said pressure chamber and subjected to pressure of said first brake circuit, and a second bore in said annular piston coaxial of said axis; and a control piston preloaded by a spring extending through and slidable in said second bore having one end thereof in a controlling relationship with said closure member and bearing on said annular piston in the direction of said spring, and the other end thereof bearing against said spring and having an annular surface providing the other boundary for said pressure chamber and being subjected to pressure of said first brake circuit.

2. A control valve according to claim 1, wherein said second bore is a stepped bore having a larger diameter portion disposed adjacent said regulator outlet chamber and a smaller diameter portion disposed adjacent said pressure chamber thereby effectively reducing the effective area of said one annular surface of said annular piston with respect to the effective area of said other annular surface of said annular piston, and said one end of said control piston is radially enlarged with respect to the control portion of said control piston to be received in said larger diameter portion of said stepped bore.

3. A control valve according to claims 1 or 2, wherein said annular piston includes on its outer surface an annular chamber into which a screw extends from said housing to provide a stop to limit the axial displacement of said annular piston.

4. A control valve according to claim 2, wherein said control piston is a bipartite piston and the two different diameter piston parts are separated at a location adjacent the step of said stepped bore.

5. A control valve according to claim 4, wherein the step of said stepped bore provides a stop for the larger diameter one of said piston parts.

6. A control valve according to claim 2, wherein the step of said stepped bore provides a stop for said radially enlarged end of said control piston.

* * * * *